US008834981B2

(12) United States Patent
Ishihara et al.

(10) Patent No.: US 8,834,981 B2
(45) Date of Patent: Sep. 16, 2014

(54) MULTILAYERED PLASTIC CONTAINER

(75) Inventors: Takayuki Ishihara, Kanagawa (JP); Yuuki Tashiro, Kanagawa (JP); Kota Mori, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 13/882,590

(22) PCT Filed: Nov. 16, 2011

(86) PCT No.: PCT/JP2011/076405
§ 371 (c)(1),
(2), (4) Date: Apr. 30, 2013

(87) PCT Pub. No.: WO2012/067147
PCT Pub. Date: May 24, 2012

(65) Prior Publication Data
US 2013/0213850 A1  Aug. 22, 2013

(30) Foreign Application Priority Data
Nov. 18, 2010 (JP) ................................. 2010-258277

(51) Int. Cl.
| B29D 22/00 | (2006.01) |
| B32B 27/08 | (2006.01) |
| B32B 27/32 | (2006.01) |
| B65D 1/00  | (2006.01) |
| C08L 23/08 | (2006.01) |
| C08L 51/06 | (2006.01) |

(52) U.S. Cl.
CPC ................. B32B 27/08 (2013.01); B32B 27/32 (2013.01); B65D 1/00 (2013.01); C08L 23/0861 (2013.01); C08L 51/06 (2013.01)
USPC ............................ 428/36.6; 428/36.7; 525/57

(58) Field of Classification Search
CPC ............ B65D 1/00; B65D 1/40; B65D 65/40; B32B 27/08; B32B 27/306; B32B 27/32; B32B 2272/00; B32B 2270/00; B32B 2307/7244; B32B 7/10; B32B 2439/40; B32B 27/28; C09J 123/0861; C08L 23/0861; C08L 51/06
USPC ........ 428/36.6, 36.7, 35.7; 206/524.6; 525/57
See application file for complete search history.

(56) References Cited

U.S. PATENT DOCUMENTS

| 5,053,457 | A | 10/1991 | Lee |
| 7,354,655 | B2 | 4/2008 | Yamaguchi et al. |
| 2002/0001686 | A1* | 1/2002 | Kashiba et al. ............... 428/35.7 |
| 2003/0175538 | A1 | 9/2003 | Miwa et al. |
| 2006/0257652 | A1* | 11/2006 | Su ........................... 428/355 EN |
| 2010/0092621 | A1 | 4/2010 | Akutsu et al. |
| 2010/0129577 | A1 | 5/2010 | Sasai et al. |
| 2010/0206762 | A1 | 8/2010 | Sasai et al. |
| 2010/0323140 | A1* | 12/2010 | Ishihara et al. ............... 428/36.7 |
| 2012/0040198 | A1 | 2/2012 | Ishihara et al. |
| 2013/0213850 | A1* | 8/2013 | Ishihara et al. ............ 206/524.6 |

FOREIGN PATENT DOCUMENTS

| JP | 03-035079 | 2/1991 |
| JP | 2000-248246 | 9/2000 |
| JP | 2003-160706 | 6/2003 |
| JP | 3788442 | 4/2006 |
| JP | 2006-123530 | 5/2006 |
| JP | 2006-176718 | 7/2006 |
| JP | 2007-320576 | 12/2007 |

OTHER PUBLICATIONS

International Search Report issued in connection with PCT/JP2011/076405 on Feb. 28, 2012.

* cited by examiner

Primary Examiner — N. Edwards
(74) Attorney, Agent, or Firm — Greenblum & Bernstein, P.L.C.

(57) ABSTRACT

[Problems] To provide a multilayered plastic container which exhibits excellent oxygen-barrier property of the ethylene-vinyl alcohol copolymer to a sufficient degree without the need of providing a special adhesive layer, and which, when a polyolefin resin is used to form the inner and outer layers, too, not only permits the ethylene-vinyl alcohol copolymer to be effectively used but also makes it very easy to set the conditions for satisfying predetermined properties.
[Means for Solution] A multilayered plastic container comprising an oxygen-barrier layer of an ethylene-vinyl alcohol copolymer that serves as a matrix and an adhesive intermediate layer of a blend of an ethylene-vinyl alcohol copolymer and a maleic anhydride-modified olefin resin neighboring each other between an inner layer and an outer layer, wherein both the ethylene-vinyl alcohol copolymer used for forming said oxygen-barrier layer and the ethylene-vinyl alcohol copolymer used for forming said adhesive intermediate layer have an ethylene content of 20 to 60 mol %; and said adhesive intermediate layer contains said ethylene-vinyl alcohol copolymer and the maleic anhydride-modified olefin resin at a weight ratio of 4:6 to 8:2, and contains, as said maleic anhydride-modified olefin resin, a high MFR component having an MFR at 190° C. of 100 to 500 g/10 min. and a low MFR component having an MFR at 190° C. of 2 to 90 g/10 min.

6 Claims, No Drawings

MULTILAYERED PLASTIC CONTAINER

TECHNICAL FIELD

This invention relates to a multilayered plastic container having, as an intermediate layer, a layer (adhesive intermediate layer) of a blend of an ethylene-vinyl alcohol copolymer (hereinafter often called EVOH copolymer) and a maleic anhydride-modified olefin resin (hereinafter often called MAMO resin) and, specifically, to a multilayered plastic container used for packing.

BACKGROUND ART

Polyolefin resins such as polyethylene and polypropylene and polyester resins as represented by a polyethylene terephthalate have excellent properties such as formability, transparency, mechanical strength and resistance against chemicals and have, therefore, been used as packing materials such as films, sheets and bottles in a variety of fields.

The EVOH copolymer (saponified product of an ethylene-vinyl acetate copolymer of a saponification degree close to 100%) has been known as a resin having excellent oxygen-barrier property. In the field of packing materials, in particular, there have been widely used multilayered structures using the polyolefin resin or the polyester resin as the inner and outer layers and using the EVOH copolymer as the intermediate layer (oxygen-barrier layer).

In recent years, further, as a structure having excellent oxygen barrier property, there has also been put into practical use a multilayered structure having, as an intermediate layer (oxygen-barrier layer), a layer of an oxygen-absorbing resin obtained by dispersing, in the EVOH copolymer, the oxygen-absorbing components inclusive of an oxidizing organic component of an unsaturated group-containing ethylene-based polymer (e.g., polybutadiene, etc.) and a transition metal catalytic component such as iron or cobalt between the inner and outer layers (e.g., see patent document 1).

Here, despite of its excellent oxygen-barrier property, the EVOH copolymer has poor adhesive property to other resins. Therefore, it is necessary to form an adhesive layer neighboring the layer that contains the EVOH copolymer. Referring, for example, to the multilayered structure having an oxygen-absorbing resin layer proposed in the patent document 1, the EVOH copolymer is used as a resin base member of the oxygen-absorbing resin layer and, besides, the layers of the EVOH copolymer are formed on both sides of the oxygen-absorbing resin layer in order to compensate for a decrease in the oxygen-absorbing capability (decrease in the oxygen-barrier property) due to the aging of the oxygen-absorbing resin layer. Here, the layer of the EVOH copolymer has been adhered to the inner and outer layers via adhesive layers. To utilize the EVOH copolymer as described above, it is necessary to form adhesive layers which are not really necessary for improving the function of the packing materials causing, therefore, the layer structure to become complex and, besides, necessitating an extruder for forming the adhesive layers resulting in an increase in the cost of production. Therefore, it has been urged to improve the above problems.

As a packing material that solves the above problems, a patent document 2 proposes a multilayered structure having an intermediate layer of a blend of the EVOH copolymer and the polyester resin.

PRIOR ART DOCUMENTS

Patent Documents

Patent document 1: JP-A-2007-320576
Patent document 2: Japanese Patent No. 3788442

OUTLINE OF THE INVENTION

Problems that the Invention is to Solve

The multilayered structure proposed in the patent document 2 has an advantage in that the intermediate layer of the blend of the EVOH copolymer and the polyester resin by itself has oxygen-barrier property and adhering property obviating the need of forming any special adhesive layers. However, the intermediate layer exhibits excellent adhesiveness to the inner and outer layers only when a polyester resin such as polyethylene terephthalate is used as the inner and outer layers, but does not almost exhibit adhesiveness to the inner and outer layers when an olefin resin is used as the inner and outer layers permitting the occurrence of delamination. After all, therefore, it becomes necessary in this case to form adhesive layers.

By applying the means proposed in the patent document 2, further, it can be contrived to form an intermediate layer of a blend of the EVOH copolymer and the polyolefin resin. However, the EVOH copolymer and the polyolefin resin are very poorly compatible with each other, and it is difficult to homogeneously disperse the EVOH copolymer in the blend and, therefore, it is difficult to fully utilize the excellent oxygen-barrier property possessed by the EVOH copolymer. Further, if the EVOH copolymer is used in large amounts in an attempt to realize its excellent oxygen-barrier property, the adhesiveness decreases to the inner and outer layers (polyolefin resin layers). Therefore, the above means cannot be applied when it is attempted to form the inner and outer layers by using the polyolefin resin.

The present applicant has, further, discovered that when a blend of the EVOH copolymer and the MAMO resin that is a widely used adhesive is used in the form of an intermediate layer, there are obtained not only excellent oxygen-barrier property but also excellent adhesiveness to the inner and outer layers of the polyolefin resin if the above two components are so distributed as to form a vivid interface, and filed a patent application (PCT/JP2011/058376). Namely, the multilayered structure proposed in this PCT application has an advantage of preventing the delamination of the layer that contains the EVOH copolymer due to being blended with the MAMO resin in such an amount that will not impair the oxygen-barrier property of the EVOH copolymer. In forming the multilayered structure, however, it becomes necessary to numerically express the distribution of contrast of the EVOH copolymer and the MAMO resin that is a widely used adhesive in the blend thereof which is forming the intermediate layer and to set the distribution of contrast to lie in a predetermined range. It, therefore, becomes necessary to use a special software for analyzing the image, and a further improvement is desired since it is not easy to determine the production conditions for satisfying predetermined properties.

It is, therefore, an object of the present invention to provide a multilayered plastic container which exhibits excellent oxygen-barrier property of the EVOH copolymer to a sufficient degree without the need of providing a special adhesive layer. Another object of the present invention is to provide a multilayered plastic container which, even when a polyolefin resin is used to form the inner and outer layers, not only permits the EVOH copolymer to be effectively used as the intermediate layer but also makes it very easy to set the conditions for satisfying predetermined properties.

Means for Solving the Problems

The present inventors have conducted experiments extensively concerning the layer structure in which the layer of a blend of an EVOH copolymer and a MAMO resin was formed neighboring an oxygen-barrier layer that contained the EVOH copolymer as a matrix, have discovered that the adhesiveness between the layer of the blend and the oxygen-barrier layer could be greatly improved by using, as the MAMO resin, a high MFR MAMO resin having a high fluidity and a low MFR MAMO resin having a low fluidity in such amounts that will not impair excellent oxygen-barrier property of the EVOH copolymer, and have thus completed the present invention.

According to the present invention, there is provided a multilayered plastic container comprising an oxygen-barrier layer of an EVOH copolymer that serves as a matrix and an adhesive intermediate layer of a blend of an EVOH copolymer and a MAMO resin neighboring each other between an inner layer and an outer layer, wherein:

both the EVOH copolymer used for forming the oxygen-barrier layer and the EVOH copolymer used for forming the adhesive intermediate layer have an ethylene content of 20 to 60 mol %; and the adhesive intermediate layer contains the EVOH copolymer and the MAMO resin at a weight ratio of 4:6 to 8:2, and contains, as the MAMO resin, a high MFR component having an MFR at 190° C. of 100 to 500 g/10 min. and a low MFR component having an MFR at 190° C. of 2 to 90 g/10 min.

In the multilayered plastic container of the present invention, it is desired that:
(1) The adhesive intermediate layer contains, as the MAMO resin, the high MFR component and the low MFR component at a weight ratio of 1:9 to 7:3;
(2) The MAMO resin comprising the high MFR component has an acid-modified ratio in a range of 0.3 to 5.0%;
(3) The peel strength of the adhesive intermediate layer in a container body portion is not less than 1 N/15 mm;
(4) The adhesive intermediate layer contains, in an amount of 0.5 to 5% by weight, the EVOH copolymer that has an ethylene content of not less than 80 mol %; and
(5) At least either the inner layer or the outer layer is formed by using an olefin resin.

Effects of the Invention

The plastic container of the present invention has a basic layer structure in which an oxygen-barrier layer of an EVOH copolymer that serves as a matrix and an adhesive intermediate layer of a blend of an EVOH copolymer and a MAMO resin are formed neighboring each other between the inner layer and the outer layer, and the EVOH copolymers used for forming the oxygen-barrier layer and the adhesive intermediate layer are both of such grades that are used as oxygen-barrier resins in the field of packing materials and, concretely speaking, have an ethylene content in a range of 20 to 60 mol %. Here, a specifically important feature resides in the following point.

Namely, a distinguished feature resides in that the MAMO resin blended with the EVOH copolymer in the adhesive intermediate layer contains a high MFR component having an MFR at 190° C. of 100 to 500 g/10 min. and a low MFR component having an MFR at 190° C. of 2 to 90 g/10 min. Upon using the high MFR component and the low MFR component in combination in such amounts that will not impair the oxygen-barrier property of the EVOH copolymers, it is allowed to greatly improve the adhesiveness between the oxygen-barrier layer that uses the EVOH copolymer as the matrix and the adhesive intermediate layer of the blend. Besides, the adhesive intermediate layer exhibits excellent adhesiveness to the olefin resin, too, making it, therefore, possible to effectively prevent the delamination even in case at least either the inner layer or the outer layer is formed by using the olefin resin.

The fact that, upon using the MAMO resin of a high MFR and the MAMO resin of a low MFR in combination according to the present invention, the adhesive intermediate layer exhibits highly adhering property to the neighboring oxygen-barrier layer that contains the EVOH copolymer was discovered as a phenomenon as a result of extensive experiment. Though the reasons have not been clarified yet, the present inventors presume it as described below.

Namely, the adhesiveness between the oxygen-barrier layer and the adhesive intermediate layer in the multilayered plastic container is more improved by the affinity between the EVOH copolymers contained in the two layers and by the formation of a hydrogen bond between a carboxylic acid group possessed by the MAMO resin in the adhesive intermediate layer and an OH group possessed by the EVOH copolymer in the oxygen-barrier layer.

Here, the multilayered plastic container is produced by forming a preform having a multilayered structure corresponding to the container by an extrusion forming or an injection forming, and subjecting the obtained preform to a secondary forming (melt forming or solid-phase forming). In the adhesive intermediate layer thus formed, usually, the MAMO resin is homogeneously distributed. Therefore, most of the carboxylic acid groups of the MAMO resin are consumed by the formation of hydrogen bond with the OH groups of the EVOH copolymer in the adhesive intermediate layer, and very little carboxylic acid groups are left for forming the hydrogen bond with the OH groups of the EVOH copolymer in the neighboring oxygen-barrier resin. Therefore, the adhesiveness is not so much improved by the latter hydrogen bond.

In the present invention which uses the MAMO resin of a high MFR and the MAMO resin of a low MFR, however, the high MFR component having a high fluidity is distributed on the side of the interface thereof to the neighboring layer and the low MFR component is distributed within the layer due to being melted and flown at the time of forming a preform. Namely, upon using the two kinds of MAMO resins having different fluidities, the MAMO resin is distributed in a predetermined amount in the adhesive intermediate layer on the side of the interface thereof to the neighboring layer making it, therefore, possible to secure the amount of the carboxylic acid groups of the MAMO resin that can be consumed for forming the hydrogen bond with the OH groups of the EVOH copolymer in the oxygen-barrier layer and, therefore, to attain a high adhesiveness between the oxygen-barrier layer containing the EVOH copolymer and the adhesive intermediate layer neighboring the oxygen-barrier layer. If further described, the MAMO resin of the high MFR has an acid-modified ratio higher than that of the low MFR or, in other words, contains more carboxylic acid groups. Presumably, therefore, being assisted by a larger content of the carboxylic acid groups, the MAMO resin of the high MFR forms much hydrogen bond that contributes to improving the adhesiveness enabling higher adhesiveness to be obtained.

In the present invention, further, the MAMO resin of the high MFR is much distributed in the adhesive intermediate layer on the side of the interface thereof to the neighboring layer. Therefore, in case at least either one of the inner layer and the outer layer is formed by using the olefin resin, the adhesiveness to the inner layer and the outer layer can be improved by arranging the inner or outer layer of olefin resin on the side of one interface of the adhesive intermediate layer.

According to the present invention, attention is given to the MFR of the MAMO resin that is used for forming the adhesive intermediate layer, and improvement in the adhering force between the layers is realized by setting a simple means or condition of using the MAMO resin of the high MFT and the MAMO resin of the low MFR in combination. Thus, the invention can be very easily put into practice without relying upon such means as analyzing images by using a special software.

MODE FOR CARRYING OUT THE INVENTION

The multilayered plastic container of the present invention has an inner layer and an outer layer. Between the inner layer and the outer layer, there are arranged, as an intermediate layer, an oxygen-barrier layer and an adhesive intermediate layer neighboring each other.

<Inner and Outer Layers>

In the present invention, there is no special limitation on the resins for forming the inner and outer layers, and a variety of kinds of thermoplastic resins can be used for forming the inner and outer layers. Specifically, from the standpoint of use as packing materials, there can be used thermoplastic polyesters such as polyethylene terephthalate, polyethylen naphthalate, polybutylene terephthalate and polybutylene naphthalate that have been favorably used specifically in this field. Among them, the polyolefin resin is particularly preferred. When the inner and outer layers are formed by using the polyolefin resin, the present invention makes it possible to effectively utilize an excellent oxygen-barrier property of the EVOH copolymer that has almost no adhesiveness to the polyolefin resin without the need of any special adhesive layers or without accompanied by such an inconvenience as delamination. Namely, excellent effect of the present invention is exhibited to a maximum degree particularly when the polyolefin resin is used.

As the above polyolefin resin, there can be exemplified such polyethylenes as low-density polyethylene (LDPE), medium-density polyethylene (MDPE), high-density polyethylene (HDPE), linear low-density polyethylene (LLDPE) and linear very-low-density polyethylene (LVLDPE); as well as polypropylene, ethylene-propylene copolymer, polybutene-1, ethylene-butene-1 copolymer, propylene-butene-1 copolymer, ethylene-propylene-butene-1 copolymer, ethylene-vinyl acetate copolymer and ionically crosslinked olefin copolymer (ionomer).

The above-mentioned various resins for forming the inner and outer layers may be those of the extrusion grade or the injection grade that have heretofore been use in the field of packing materials.

Here, the inner layer and the outer layer do not have to be formed by using the same kind of resin. For instance, the outer layer may be formed by using the above-mentioned polyester resin and the inner layer may be formed by using the polyolefin resin, as a matter of course. As required, further, the inner and outer layers may be blended with a lubricating agent, a reforming agent, a pigment, an ultraviolet ray absorber and the like.

<Oxygen-Barrier Layer>

The oxygen-barrier layer provided as an intermediate layer between the inner layer and the outer layer comprises the EVOH copolymer as the matrix. So far as the EVOH copolymer is used as the matrix, the oxygen-barrier layer may be a layer of the EVOH copolymer only or may be a layer of the EVOH copolymer in which an oxygen-absorbing component is dispersed.

The EVOH copolymer used as the matrix has been widely known by itself and is the one of a grade that has been used as an oxygen-barrier resin in the field of packing materials.

Concretely speaking, there is preferably used a saponified product of a copolymer obtained by so saponifying an ethylene-vinyl acetate copolymer having an ethylene content of 20 to 60 mol % and, specifically, 25 to 50 mol % that the saponification degree thereof is not less than 96 mol % and, specifically, not less than 99 mol %. The EVOH copolymer (saponified product of the ethylene-vinyl acetate copolymer having a saponification degree close to 100%) should have a molecular weight large enough for forming a film and is, usually, desired to have an intrinsic viscosity of not less than 0.01 dl/g and, specifically, not less than 0.05 dl/g as measured at 30° C. in a mixed solvent of phenol and water at a weight ratio of 85/15.

The above EVOH copolymer exhibits excellent oxygen-barrier property by itself and is capable of forming an oxygen-barrier layer by itself. Recently, however, attempts have been made to disperse an oxygen-absorbing component in the EVOH copolymer to impart a function for absorbing and trapping oxygen that passes through in addition to the function of shutting oxygen off. This oxygen-barrier layer is hereinafter called oxygen-absorbing barrier layer.

The oxygen-absorbing barrier layer uses an oxidizing organic component and a transition metal catalytic component as oxygen-absorbing components. These components may be the known ones disclosed in the above-mentioned patent document 1 and the like. That is, upon being oxidized by absorbing oxygen, the oxidizing organic component exhibits a function of shutting oxygen off while the transition metal catalytic component that is contained works to promote the oxidation of the oxidizing organic component.

As the oxidizing organic component, there can be exemplified an unsaturated group-containing ethylene-based polymer. This polymer has a carbon-carbon double bond, and the double-bonded part is easily oxidized with oxygen so as to absorb and trap oxygen.

The unsaturated group-containing ethylene-based polymer is derived by using, for example, a polyene as a monomer. Preferred examples of the polyene used as the monomer are as described below though not limited thereto only.

Conjugated dienes such as butadiene and isoprene;

Chain non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene and 7-methyl-1,6-octadiene;

Cyclic non-conjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene and dicyclopentadiene; and Trienes and chloroprenes such as 2,3-diisopropylidene-5-norbornene, 2-ethylidene-3-isopropylidene-5-norbornene, and 2-propenyl-2,2-norbornadiene.

That is, as the oxidizing polymer, there can be used a homopolymer of the above polyene or a random copolymer or a block copolymer of a combination of two or more kinds of the above polyenes or of a combination of the above polyenes with other monomers.

As other monomers to be copolymerized with the above polyene, there can be used, for example, α-olefins of 2 to 20 carbon atoms or, concretely, ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene. In addition to the above, there can be, further, used styrene, vinyltriene, acrylonitrile, methacrylonitrile, vinyl acetate, methyl methacrylate and ethyl acrylate.

As the oxidizing organic component, there can be preferably used polybutadiene (BR), polyisoprene (IR), natural rubber, nitrile-butadiene rubber (NBR), styrene-butadiene rubber (SBR), chloroprene rubber and ethylene-propylene-diene rubber (EPDM) among the polymers derived from the above polyenes to which only, however, the oxidizing organic component is in no way limited. It is desired that the iodine value thereof is not less than 100 and, specifically, about 120 to about 196.

In addition to the above unsaturated group-containing ethylene-based polymers, there can be further used a polymer which by itself can be easily oxidized, such as polypropylene or ethylene-carbon oxide copolymer as the oxidizing organic component.

From the standpoint of formability, it is desired that the above-mentioned oxidizing polymer or copolymer has a viscosity at 40° C. in a range of 1 to 200 Pa·s.

As described earlier, the transition metal catalyst is used for promoting the oxidation of the oxidizing organic component, and is used in the form of an inorganic salt, an organic salt or a complex of a transition metal of a low valence.

In the transition metal catalyst, a preferred example of the transition metal is a metal of the Group VIII of periodic table, such as iron, cobalt or nickel. However, there can be, further, used a metal of the Group I, such as copper or silver, a metal of the Group IV, such as tin, titanium or zirconium, a metal of the Group V, such as vanadium, a metal of the Group VI, such as chromium, or a metal of the Group VII, such as manganese. Among them, cobalt is particularly preferred since it markedly promotes the oxygen-absorbing property (oxidation of the oxidizing organic component).

As the inorganic salt of the above transition metal, there can be exemplified a halide such as chloride, an oxysalt of sulfur such as sulfate, an oxy acid salt of nitrogen such as nitrate, a phosphorus oxysalt such as phosphate, and a silicate.

As the organic salt of the transition metal, there can be exemplified a carboxylate, sulfonate and phosphate. Among them, the carboxylate is suited for attaining the object of the invention. Concrete examples thereof include transition metal salts of acetic acid, propionic acid, isopropionic acid, butanoic acid, isobutanoic acid, pantanoic acid, hexanoic acid, heptanoic acid, isoheptanoic acid, octanoic acid, 2-ethylhexanoic acid, nonanoic acid, 3,5,5-trimethylhexanoic acid, decanoic acid, neodecanoic acid, undecanoic aid, lauric acid, myristic acid, palmitic acid, margaric acid, stearic acid, arachic acid, linderic acid, tsuzuic acid, petroselinic acid, oleic acid, linoleic acid, linolenic acid, arachidonic acid, formic acid, oxalic acid, sulfamic acid and naphthenic acid.

As the complex of the transition metal, there can be exemplified a complex with β-diketone or β-keto-acid ester. Described below are examples of the β-diketone and β-keto-acid ester.

acetylacetone,
ethyl acetoacetate,
1,3-cyclohexadion,
methylenebis-1,3-cyclohexadion,
2-benzyl-1,3-cyclohexadion,
acetyltetralone,
palmitoyltetralone,
stearoyltetralone,
benzoyltetralone,
2-acetylcyclohexanone,
2-benzoylcyclohexanone,
2-acetyl-1,3-cyclohexadion,
benzoyl-p-chlorobenzoylmethane,
bis(4-methylbenzoyl)methane,
bis(2-hydroxybenzoyl)methane,
benzoylacetone,
tribenzoylmethane,
diacetylbenzoylmethane,
stearoylbenzoylmethane,
palmitoylbenzoylmethane,
lauroylbenzoylmethane,
dibenzoylmethane,
bis(4-chlorobenzoyl)methane,
benzoylacetylphenylmethane,
stearoyl(4-methoxybenzoyl)methane,
butanoylacetone,
distearoylmethane,
stearoylacetone,
bis(cyclohexanoyl)methane, and
dipivaroylmethane.

The above oxidizing organic components and the transition metal catalysts are dispersed in the EVOH copolymer. Namely, these oxygen-absorbing components (specifically, oxidizing organic components) are dissipated upon absorbing oxygen and their oxygen absorbing capabilities gradually decrease. By dispersing these oxygen-absorbing components in the EVOH copolymer having high oxygen-barrier property, however, it is allowed to suppress the dissipation of the oxygen absorbing capabilities, i.e., to maintain the oxygen absorbing capabilities over extended periods of time.

In the oxygen-absorbing barrier layer, the oxidizing organic component is preferably used in an amount of 1 to 15 parts by weight and, specifically, 2 to 10 parts by weight per 100 parts by weight of the EVOH copolymer, and the transition metal catalyst is preferably added in an amount of 10 to 1000 ppm and, specifically, 50 to 500 ppm calculated as metal.

Here in the embodiment provided with the above oxygen-absorbing barrier layer as the oxygen-barrier layer, it is probable that low-molecular components such as aldehydes and the like are formed accompanying the oxidation of the oxidizing organic components to become a cause of odor and color and, besides, to deteriorate flavor of the content in the container. In the embodiment provided with the oxygen-absorbing barrier layer, therefore, it is desired to add a deodorant to the inner or outer layers and, particularly, to the inner layer.

As the deodorant, it is desired to use a porous inorganic material comprising a silicate as a chief component, i.e., powder of zeolite or active clay obtained by treating a smectite clay mineral such as montmorillonite with an acid. In particular, it is desired to use a high silica zeolite (silica/alumina ratio of 100 or more) which is the Na-type ZSM5 zeolite having an excellent function for trapping odor specific to plastics and trapping the above-mentioned byproducts of oxidation. The deodorant is, usually, added to the inner layer (or the outer layer) in an amount of 0.5 to 10% by weight.

<Adhesive Intermediate Layer>

In the present invention, the adhesive intermediate layer is provided neighboring the oxygen-barrier layer that comprises the above EVOH copolymer as the matrix. Due to the adhesive intermediate layer, it is allowed to adhere and fix the oxygen-barrier layer that contains the EVOH copolymer to the inner and outer layers maintaining stability, though the EVOH copolymer has poor adhesiveness to other resins.

The adhesive intermediate layer comprises a blend of the EVOH copolymer and the MAMO resin. The EVOH copolymer is of the same kind as the one used for forming the oxygen-barrier layer, i.e., is the one of the grade that is used as an oxygen-barrier resin in the field of packing materials.

The MAMO resin has heretofore been used as an adhesive resin for forming adhesive layers, and is a graft-modified olefin resin that is graft-modified with, for example, a maleic anhydride. In this case the olefin resin that is to be graft-modified is, preferably, a polyethylene, a polypropylene or an ethylene-α-olefin copolymer.

It is necessary that the ratio (A:B) of blending the EVOH copolymer (A) and the MAMO resin (B) is from 4:6 to 8:2, preferably, from 4:6 to 7:3 and, most preferably, from 5:5 to 7:3. If the EVOH copolymer (A) is used in an amount larger than the above range, then the amount of the MAMO resin (B) decreases. Therefore, despite good oxygen-barrier property is attained, the adhesiveness decreases to the neighboring oxygen-barrier layer or to the inner or outer layer (specifically to the layer of the polyolefin resin) and it becomes necessary to provide adhesive layers for preventing delamination. On the other hand, if the amount of the MAMO resin exceeds the above range, the adhesiveness becomes sufficient to the inner and outer layers but the amount of the EVOH copolymer (A) decreases. Therefore, the oxygen-barrier property becomes poor and, after all, the intermediate layer works only as the adhesive layer.

In the present invention as described above, the EVOH copolymer of the grade of the oxygen-barrier resin and the MAMO resin are used being blended together. As for the MAMO resin, further, it is necessary to use a MAMO resin of a high MFR (high MFR component) having an MFR at 190° C. of from 100 to 500 g/10 min. and a MAMO resin of a low MFR (low MFR component) having an MFR at 190° C. of from 2 to 90 g/10 min. Namely, the low MFR component used here is a MAMO resin of a grade used for the ordinary forming. According to the present invention, however, it is an essential requirement to use a MAMO resin of a high MFR in addition to using the above MAMO resin. That is, when being melted and flown at the time of forming a preform, the high MFR component is distributed on the side of the interface to the layer that neighbors the adhesive intermediate layer. As a result, a hydrogen bond is formed relative to the EVOH copolymer which is the matrix of the oxygen-barrier layer neighboring thereto, whereby high adhesiveness is produced effectively preventing the occurrence of delamination. When either the inner layer or the outer layer is formed by using the olefin resin, too, the adhesive intermediate layer is arranged neighboring the inner or the outer layer to attain high adhesiveness to the inner layer and the outer layer.

In the present invention, if the MFR value of the high MFR component is higher than the above range, then the fluidity becomes irregular due to defective flow or overflowing, and the forming becomes defective making it difficult to form the adhesive intermediate layer. Further, if the MFR value of the high MFR component is lower than the above range, the high MFR component is not sufficiently distributed on the side of the interface to the neighboring layer. As a result, hydrogen bond is not formed in sufficient amounts and the adhering force is not improved to a sufficient degree.

Further, if the MFR value of the low MFR component is higher than the above range, then the formability decreases due to defective flow or overflowing like in the above case, and it becomes difficult to form the adhesive intermediate layer, too. If the MFR value of the low MFR component is lower than the above range, delamination occurs in the interface to the neighboring layer due to the inversion of phase, and the forming becomes defective.

In the present invention, the ratio of amounts of the high MFR component and the low MFR component may differ depending on their MFR values. Usually, however, it is desired to use the high MFR component and the low MFR component at a weight ratio of from 1:9 to 7:3 enabling the formability and the adhesiveness to be well balanced.

In the present invention, further, the MAMO resin of the high MFR is, usually, modified with an acid at a ratio higher than that of the MAMO resin of the low MFR. Therefore, use of the high MFR component having a high acid-modified ratio, too, contributes greatly to improving the adhesiveness by forming hydrogen bond much to the EVOH copolymer in the neighboring oxygen-barrier layer. It is, therefore, better that the acid-modified ratio of the high MFR component is higher. If the acid-modified ratio becomes too high, however, gelling easily occurs and the forming tends to become defective. It is, therefore, desired that the acid-modified ratio of the high MFR component is in a range of from 0.3 to 5.0% by weight and, specifically, from 0.3 to 1.0% by weight (generally, the MAMO resin used in the field of packing materials is a low MFR component having an acid-modified ratio of about 0.2% by weight).

The acid-modified ratio can be calculated relying upon the $^1$HNMR measurement and FT-IR measurement as shown in Examples appearing later.

The present invention uses, as MAMO resins, the high MFR component and the low MFR component having very different melt fluidities and, further, uses the EVOH copolymer in addition to the MAMO resins. At the time of forming, therefore, it is probable that the fluidity may become irregular and the phases may separate causing the forming to become defective. In order to prevent such inconvenience, it is desired to add, as a compatibility-improving agent, a saponified product of an ethylene-rich ethylene-vinyl acetate copolymer or, concretely, a saponified product of an ethylene-vinyl acetate copolymer having an ethylene content of not less than 80 mol %, specifically, 80 to 95 mol % and a saponification degree of not less than 50% and, specifically, not less than 90%.

The amount of use of the saponified product of the ethylene-rich ethylene-vinyl acetate copolymer used as the compatibility-improving agent may be very small so will not to impair the function for improving adhesiveness of the MAMO resins or the oxygen-barrier property of the EVOH copolymer. Concretely, the amount of use thereof may be from 0.5 to 5% by weight and, specifically, from about 1 to about 3% by weight in the adhesive intermediate layer.

<Other Layers>

The multilayered plastic container of the present invention may be provided with a regrind layer by utilizing excellent adhesiveness of the adhesive intermediate layer thereby promoting the reuse of resources. The regrind layer comprises a virgin resin for forming the inner and outer layers blended with a scrap resin of the same kind as the resin of the inner and outer layers, the scrap resin being produced at the time of forming the inner and outer layers or at the time of forming the containers. In the above-mentioned various kinds of layer structures, the regrind layer is, usually, provided between the inner layer or the outer layer and the adhesive intermediate layer and, specifically, between the inner layer and the adhesive intermediate layer.

In the above-mentioned various kinds of layer structures, the layers may have thicknesses that are suitably selected depending on the use of the multilayered structure so that properties of the layers are exhibited to their sufficient degrees.

<Layer Structures>

The multilayered plastic container of the present invention may have any layer structure so far as the oxygen-barrier resin layer and the adhesive intermediate layer are provided neighboring each other as the intermediate layer between the predetermined inner layer and the outer layer, and may have any suitable layer structure to meet the use. Described below are examples of the layer structures though the invention is not limited thereto only.

In the following examples, the oxygen-barrier layer formed by using the EVOH copolymer alone is denoted as EVOH layer, the oxygen-barrier layer (oxygen-absorbing barrier layer) blended with the oxygen-absorbing component is denoted as Sc layer, the adhesive intermediate layer is denoted as AD layer, and the regrind layer is denoted as RG layer.

Inner layer/AD layer/EVOH layer/AD layer/outer layer,
Inner layer/RG layer/AD layer/EVOH layer/AD layer/outer layer,
Inner layer (deodorant)/AD layer/Sc layer/AD layer/outer layer,
Inner layer (deodorant)/RG layer/AD layer/Sc layer/AD layer/outer layer.

<Production of the Containers>

The multilayered plastic container of the invention having the above layer structure is produced by forming a preform having a predetermined layer structure by the widely known injection forming or extrusion forming and, next, forming the obtained preform by the melt-forming or solid phase-forming (e.g., blow forming, vacuum forming or plug-assist forming). Or the multilayered plastic container can be also produced by bringing the resins together to meet together in a multi-layer die, extruding the molten resins in a manner that the intermediate layer resin is sealed therein, cutting the molten resins at a portion where there is no intermediate layer resin, throwing the molten resins into a metal mold and, thereafter, compression-forming the molten resins in a core metal mold.

For example, when a container of the shape of a bottle is to be produced, a preform of the shape of a test tube is formed and is, thereafter, subjected to the blow forming. In this case, the preform is formed in a tubular shape and its one end is pinched off so as to be closed, and is subjected to the direct blow forming to obtain a container of the shape of a bottle.

When it is attempted to produce a container of the shape of a cup, a preform of the shape of a plate is formed and is then subjected to the vacuum forming or the plug-assist forming.

In the multilayered plastic container of the present invention produced as described above, the oxygen-barrier layer is firmly adhered and fixed to the inner and outer layers due to the adhesive intermediate layer, and the peel strength of the adhesive intermediate layer is as very high as not less than 1 N/15 mm. Therefore, delamination of the oxygen-barrier layer is effectively prevented in the container body portion, and a high oxygen-barrier property is stably maintained over extended periods of time making it possible to effectively preserve a variety of contents and, specifically, a variety of beverages and foods. Specifically, the multilayered plastic container having inner and outer layers of a polyolefin resin exhibits excellent humidity resistance owing to the polyolefin resin and, by utilizing this property, therefore, can be favorably used for containing beverages such as beer, wine, fruit juices and carbonated soft drinks as well as fruits, nuts, vegetables, meet products, infant's foods, coffee, jam, mayonnaise, ketchup, edible oil, dressing, sauces, tsukudani (food boiled down in soy), milk products, processed fish, pet foods, and various other contents such as medicines, cosmetics, gasoline and the like that are subject to be deteriorated by the presence of oxygen.

The container of the present invention, further, has excellent transparency and can be favorably used as packing containers for which transparency is required.

EXAMPLES

The invention will be further described by way of the following Examples and Comparative Examples to which only, however, the invention is in no way limited.

In Examples and Comparative Examples, further, various measurements were taken by the methods described below.

(1) Acid-Modified Ratio of MAMO Resins:

The acid-modified ratio of a resin was calculated from the $^1$HNMR measurement and the FT-IR measurement. By using an NMR nuclear magnetic resonance measuring apparatus (JNM-ECA400, manufactured by JEOL Ltd.), the $^1$HNMR measurement was taken by dispersing a powder of the resin in a mixed solvent of heavy benzene/heavy ortho dichlorobenzene=1/3 while setting the temperature at 120° C. and the integral number of times to be 1024 times. A chemical shift of 0.3 ppm to 2.2 ppm in the obtained $^1$HNMR spectrum was regarded to be a signal stemming from the main chain of the resin and a chemical shift of 2.5 ppm to 2.8 ppm was regarded as a signal stemming from the acid anhydride of the resin. The acid-modified ratio was calculated from the ratio of integrations thereof.

Further, by using a Fourier transform infrared spectrophotometer (FTS7000, manufactured by Varian, Inc.), the FT-IR measurement was taken by preparing a thin film of the MAMO resin. Namely, in the obtained IR spectrum, signals of wave numbers 459, 2723 and 3190 $cm^{-1}$ were regarded to be signals stemming from the main chain, a signal of a wave number 1780 $cm^{-1}$ was regarded to be the signal stemming from the acid anhydride, and a ratio of acid-modified ratios between different resins was calculated from the ratio of integrations thereof. The acid-modified ratio of the resin was calculated by multiplying a value of the acid-modified ratio calculated from the $^1$HNMR by the ratio calculated from the IR.

(2) MFR of Pellets:

As a measuring instrument, a melt indexer (Melt Indexer F-W01, manufactured by TOYO SEIKI KOGYO CO. LTD.) was used. By using the melt indexer, the resin pellets were melt-extruded for 30 seconds through an opening (orifice) of a length of 8 mm and a diameter of 2.095 mm at a temperature of 190° C. under a load of 2.16 kg to measure the amount of the resin extruded. This was converted into the amount of the resin extruded over 10 minutes and was regarded to be the MFR of the resin at 190° C.

(3) Peel Strength:

A sheet was prepared by using the labo plastomill film-making machine. A sample for measurement was cut from the sheet or a body portion of the multilayered container, and a force for peeling it was measured by using the autograph (AG-IS, manufactured by Shimadzu Corporation). An end of the sample was peeled, both sides of the peeled surfaces were held by using air chucks, and the force required for the T-peeling at a rate of 300 mm/min by 50 mm was regarded as the peel strength.

(4) Evaluating the Oxygen-Barrier Property:

The multilayered container was filled with the nitrogen atmosphere, retort-treated at 120° C. for 30 minutes, and was preserved for one month in an environment of 30° C. and 80% RH. Thereafter, by using a gas chromatography (GC-14A, manufactured by Shimadzu Corporation), the oxygen concentration in the multilayered container was measured to find a change in the concentration with the passage of time. Those with a GC value of less than 0.1% were regarded to be ○ (good) and those with a GC value of not less than 0.1 were regarded to be × (no good).

(5) Preparation of an Oxygen-Absorbing Resin Composition:

A cobalt neodecanoate having a cobalt content of 14% by weight (DICNATE 5000, manufactured by DIC CORPORATION) was added in an amount of 350 ppm calculated as the amount of cobalt to an EVOH copolymer copolymerized with 32 mol % of ethylene (EP-F171B, manufactured by KURARAY CO., LTD.), and the mixture thereof was premixed by using a stirring/drying machine (manufactured by DALTON CO. LTD.) and was thrown into a hopper. Next, by using a biaxial extruder (TEM-35B, manufactured by TOSHIBA MACHINE CO., LTD) equipped with a strand dye at the outlet portion thereof, a maleic anhydride-modified polybutadiene (M2000-20, manufactured by Nippon Oil Corporation) was added thereto dropwise by using a liquid feeder such that the amount thereof was 5% by weight relative to the EVOH copolymer blended with the cobalt neodecanoate, and the mixture was stranded at a forming temperature of 200° C. while conducting the low-vacuum venting at a screw revolving speed of 100 rpm to obtain an oxygen-absorbing resin composition.

Example 1

By using the labo plastomill film-making machine, a three-kind-three-layer sheet comprising oxygen-barrier layer (70 μm)/adhesive intermediate layer (100 μm)/polypropylene layer (70 μm) was prepared at a forming temperature of 230° C., and a peel strength was measured between the oxygen-barrier layer and the adhesive intermediate layer of the sheet.

The following resins were used, i.e., oxygen-barrier Layer—the above oxygen-absorbing resin composition, propylene Layer—Noblen FH1016 (manufactured by Sumitomo Chemical Co., Ltd.), adhesive intermediate layer—a dry blend of the following resins:

EVOH copolymer resin for oxygen barrier;
  SP521B, manufactured by KURARAY CO., LTD.,
  Ethylene content: about 27 mol %,
  Blending ratio: 58.5% by weight,
MAMO resin;
  High MFR component (hereinafter AD1);
    Fusabond P613, manufactured by Du Pont Kabushiki Kaisha,
    Acid-modified ratio: 0.4%,
    MFR: 120 g/10 min,
    Blending ratio: 9.8% by weight
  Low MFR component (hereinafter AD2);
    ADMER QF551, manufactured by Mitsui Chemicals, Inc.,
    Acid-modified ratio: 0.2%,
    MFR: 2.5 g/10 min,
    Blending ratio: 29.3% by weight Compatibility-improving agent;
  EVOH copolymer resin;
    Melthene H6051, manufactured by TOSOH CORPORATION,
    Ethylene content: 89 mol %,
    Saponification degree: about 100%,
    Blending ratio: 2.4% by weight.

By using the labo plastomill film-making machine, the sheet could be prepared without any problem, and a high adhering strength could be obtained. This was presumably due to that the high MFR component much distributed in the interface and exhibited sufficiently large adhesiveness to the neighboring layer.

Example 2

The test was conducted in the same manner as in Example 1 but changing the blending ratios in the adhesive intermediate layer to be 60% by weight of the EVOH copolymer for oxygen barrier, 10% by weight of the AD1 and 30% by weight of the AD2.

As a result, a sheet could be prepared without problem though the fluidity became irregular to some extent at the time of forming the sheet, and a large adhering strength could be obtained.

Example 3

The test was conducted in the same manner as in Example 1 but changing the blending ratios in the adhesive intermediate layer to be 70% by weight of the EVOH copolymer for oxygen barrier, 15% by weight of the AD1 and 15% by weight of the AD2.

As a result, a sheet could be prepared without problem though the fluidity became irregular to some extent at the time of forming the sheet, and a large adhering strength could be obtained.

Example 4

The test was conducted in the same manner as in Example 1 but changing the blending ratios in the adhesive intermediate layer to be 50% by weight of the EVOH copolymer for oxygen barrier, 5% by weight of the AD1 and 45% by weight of the AD2.

As a result, a sheet could be prepared without problem though the fluidity became irregular to some extent at the time of forming the sheet, and a large adhering strength could be obtained.

Example 5

The test was conducted in the same manner as in Example 2 but using the Fusabond P353 (acid-modified ratio: 0.8% by weight, MFR: 450 g/10 min) manufactured by Du Pont Kabushiki Kaisha as the AD1.

As a result, a sheet could be prepared without problem though the fluidity became irregular to some extent at the time of forming the sheet, and a large adhering strength could be obtained.

Comparative Example 1

The test was conducted in the same manner as in Example 1 but changing the blending ratios in the adhesive intermediate layer to be 50% by weight of the EVOH copolymer for oxygen barrier and 50% by weight of the AD2.

As a result, a sheet could be prepared without problem though the fluidity became irregular to some extent at the time of forming the sheet. However, delamination easily occurred, and a large adhering strength could not be obtained.

Comparative Example 2

The test was conducted in the same manner as in Example 1 but changing the blending ratios in the adhesive intermediate layer to be 60% by weight of the EVOH copolymer for oxygen barrier and 40% by weight of the AD2.

As a result, a sheet could be prepared without problem though the fluidity became irregular to some extent at the time of forming the sheet. However, delamination easily occurred, and a large adhering strength could not be obtained.

Comparative Example 3

The test was conducted in the same manner as in Example 1 but using the P353 as the AD1 and changing the blending ratios in the adhesive intermediate layer to be 60% by weight of the EVOH copolymer for oxygen barrier and 40% by weight of the AD1.

As a result, irregularity and cracks occurred much at the time of forming the sheet and no sheet could be prepared. This presumably resulted from a high acid-modified ratio of the P353, the P353 reacting excessively with the EVOH copolymer for oxygen barrier in the adhesive intermediate layer in the extruder.

Comparative Example 4

The test was conducted in the same manner as in Example 2 but using the ADMER QB550 (acid-modified ratio: 0.2% by weight, MFR: 1.0 g/10 min) manufactured by Mitsui Chemicals, Inc. as the AD2.

As a result, a sheet could be prepared without problem though the fluidity became irregular to some extent at the time of forming the sheet. However, with the matrix of the adhesive intermediate layer being the EVOH copolymer, delamination easily occurred.

Comparative Example 5

The test was conducted in the same manner as in Example 5 but using the P613 (acid-modified ratio: 0.4% by weight, MFR: 120 g/10 min) as the AD2.

As a result, irregularity and cracks occurred much at the time of forming the sheet and no sheet could be prepared. This presumably resulted from an excessive reaction of the EVOH copolymer for oxygen barrier with the AD1 and AD2 in the adhesive intermediate layer in the extruder and from differences in the fluidity.

Comparative Example 6

The test was conducted in the same manner as in Example 1 but changing the blending ratios in the adhesive intermediate layer to be 100% by weight of the QF551.

As a result, a sheet could be prepared without problem, and a large adhesive strength could be obtained.

Results of Examples 1 to 5 and Comparative Examples 1 to 6 were as shown in Table 1 from which it was learned that the adhering strength of the adhesive intermediate layer was affected by the MFR of MAMO resin, acid-modified ratio thereof and blending ratio thereof.

TABLE 1

| | Composition of adhesive intermediate layer | | | | | | | | | | |
|---|---|---|---|---|---|---|---|---|---|---|---|
| | Ethylene-vinyl alcohol copolymer | | Maleic anhydride-modified olefin resin | | | | | | Compatibility-improving agent | | labo plasto test | |
| | | | High MFR component (AD1) | | | Low MFR component (AD2) | | | | | | |
| | *1 | *2 | | MFR | | | MFR | | *1 | *2 | | |
| | mol % | wt % | *3 wt % | g/10 min (190° C.) | *2 wt % | *3 wt % | g/10 min (190° C.) | *2 wt % | mol % | wt % | Matrix | *4 N/15 mm |
| Ex. 1 | 27 | 58.5 | 0.4 | 120 | 9.8 | 0.2 | 2.5 | 29.3 | 89 | 2.4 | AD | 5.1 |
| Ex. 2 | 27 | 60 | 0.4 | 120 | 10 | 0.2 | 2.5 | 30 | — | — | AD | 6.8 |
| Ex. 3 | 27 | 70 | 0.4 | 120 | 15 | 0.2 | 2.5 | 15 | — | — | AD | 5.0 |
| Ex. 4 | 27 | 50 | 0.4 | 120 | 5 | 0.2 | 2.5 | 45 | — | — | AD | 5.8 |
| Ex. 5 | 27 | 60 | 0.8 | 450 | 10 | 0.2 | 2.5 | 30 | — | — | AD | 8.7 |
| Comp. Ex. 1 | 27 | 50 | — | — | — | 0.2 | 2.5 | 50 | — | — | AD | 0.6 |
| Comp. Ex. 2 | 27 | 60 | — | — | — | 0.2 | 2.5 | 40 | — | — | EVOH | 0.5 |
| Comp. Ex. 3 | 27 | 60 | 0.8 | 450 | 40 | — | — | — | — | — | — | *5 |
| Comp. Ex. 4 | 27 | 60 | 0.4 | 120 | 10 | 0.2 | 1.0 | 30 | — | — | EVOH | 0.8 |
| Comp. Ex. 5 | 27 | 60 | 0.8 | 450 | 10 | 0.4 | 120 | 30 | — | — | — | *5 |
| Comp. Ex. 6 | — | — | — | — | — | 0.2 | 2.5 | 100 | — | — | AD | *6 |

*1: Ethylene content,
*2: Blended amount,
*3: Acid-modified ratio,
*4: Adhering strength,
*5: not formed,
*6: not peeled Next, the multilayered container using the adhesive intermediate layer was evaluated for its adhering strength and oxygen-barrier property.

Example 6

By using a multilayered sheet-forming machine, there was prepared a multilayered sheet (total thickness of 1500 μm) of a five-kind-six-layer constitution comprising polypropylene inner layer (195 μm)/regrind layer (495 μm)/adhesive intermediate layer (blend layer, 105 μm)/oxygen-absorbing barrier layer (150 μm)/adhesive intermediate layer (blend layer, 105 μm)/polypropylene outer layer (450 μm). The adhesive intermediate layers were formed by using the same resin composition as that of Example 1. As the regrind layer, there was used a dry blend of pulverized materials of the polypropylene and of the above multilayered sheet.

The above multilayered sheet was heated at 210° C. by using a far infrared heater and was subjected to the secondary forming (melt-forming) by using a plug-assist vacuum/compressed air forming machine to prepare a multilayered container having a drawing ratio H/D=0.5. The obtained multilayered container was measured for its peel strength at the container body portion and oxygen-barrier property. As a result, a large adhering strength and a high oxygen-barrier property were exhibited.

Example 7

The test was conducted in the same manner as in Example 6 but changing the forming temperature of the secondary forming to 160° C. As a result, though the adhering strength was smaller than that of the melt-forming of Example 6, no delamination occurred during the forming and good oxygen-barrier property was exhibited.

Comparative Example 7

The test was conducted in the same manner as in Example 7 but forming the adhesive intermediate layers by using the same resin composition as that of Comparative Example 1. As a result, a sufficiently large adhering strength could not be obtained.

Comparative Example 8

The test was conducted in the same manner as in Example 7 but forming the adhesive intermediate layers by using the same resin composition as that of Comparative Example 6. As a result, though a sufficiently large adhering strength could be obtained, a sufficiently high oxygen-barrier property was not obtained and oxygen gradually permeated into the container after the passage of time.

Results of Examples 6 and 7 and Comparative Examples 7 and 8 were as shown in Table 2 from which it was learned that the multilayered plastic container of the present invention exhibited high adhesiveness and oxygen-barrier property even after having been subjected to the secondary forming.

TABLE 2

| | Sheet-forming temp. ° C. | Cup-forming temp. ° C. | Peel strength N/15 mm | Oxygen barrier evaluated |
|---|---|---|---|---|
| Example 6 | 230 | 210 | 4.19 | ○ | ○ |
| Example 7 | 230 | 160 | 1.03 | ○ | ○ |
| Comp. Ex. 7 | 230 | 160 | 0.46 | x | ○ |
| Comp. Ex. 8 | 230 | 160 | 19.23 | ○ | x |

The invention claimed is:

1. A multilayered plastic container comprising an oxygen-barrier layer of an ethylene-vinyl alcohol copolymer that serves as a matrix and an adhesive intermediate layer of a blend of an ethylene-vinyl alcohol copolymer and a maleic anhydride-modified olefin resin neighboring each other between an inner layer and an outer layer, wherein:

both the ethylene-vinyl alcohol copolymer used for forming said oxygen-barrier layer and the ethylene-vinyl alcohol copolymer used for forming said adhesive intermediate layer have an ethylene content of 20 to 60 mol %; and said adhesive intermediate layer contains said ethylene-vinyl alcohol copolymer and the maleic anhydride-modified olefin resin at a weight ratio of 4:6 to 8:2, and contains, as said maleic anhydride-modified olefin resin, a high MFR component having an MFR at 190° C. of 100 to 500 g/10 min. and a low MFR component having an MFR at 190° C. of 2 to 90 g/10 min.

2. The multilayered plastic container according to claim 1, wherein said adhesive intermediate layer contains, as said maleic anhydride-modified olefin resin, said high MFR component and said low MFR component at a weight ratio of 1:9 to 7:3.

3. The multilayered plastic container according to claim 1, wherein said maleic anhydride-modified olefin resin comprising the high MFR component has an acid-modified ratio in a range of 0.3 to 5.0%.

4. The multilayered plastic container according to claim 1, wherein the peel strength of said adhesive intermediate layer in a container body portion is not less than 1 N/15 mm.

5. The multilayered plastic container according to claim 1, wherein said adhesive intermediate layer contains, in an amount of 0.5 to 5% by weight, the ethylene-vinyl alcohol copolymer that has an ethylene content of not less than 80 mold.

6. The multilayered plastic container according to claim 1, wherein at least either said inner layer or said outer layer is formed by using an olefin resin.

* * * * *

UNITED STATES PATENT AND TRADEMARK OFFICE
CERTIFICATE OF CORRECTION

PATENT NO. : 8,834,981 B2  Page 1 of 1
APPLICATION NO. : 13/882590
DATED : September 16, 2014
INVENTOR(S) : T. Ishihara et al.

It is certified that error appears in the above-identified patent and that said Letters Patent is hereby corrected as shown below:

In The Claim

Column 18, line 53 (claim 5, line 5), please change "mold." to -- mol%. --

Signed and Sealed this
Seventeenth Day of March, 2015

Michelle K. Lee
*Director of the United States Patent and Trademark Office*